(12) United States Patent
Karlsson

(10) Patent No.: US 6,654,454 B1
(45) Date of Patent: Nov. 25, 2003

(54) METHOD AND DEVICES RELATED TO FEATURES OR FEATURE AGENT AND METHOD OF CONTROLLING PROCESS FLOW BETWEEN FEATURES

(75) Inventor: Håkan Karlsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/600,541

(22) PCT Filed: Jan. 8, 1999

(86) PCT No.: PCT/SE99/00013

§ 371 (c)(1),
(2), (4) Date: Jul. 18, 2000

(87) PCT Pub. No.: WO99/38339

PCT Pub. Date: Jul. 29, 1999

(30) Foreign Application Priority Data

Jan. 23, 1998 (SE) .............................................. 9800175

(51) Int. Cl.[7] .............................................. H04M 3/42
(52) U.S. Cl. ................................................. 379/201.01
(58) Field of Search ....................... 379/201.01, 201.02, 379/201.03, 201.04, 201.05, 201.12

(56) References Cited

U.S. PATENT DOCUMENTS

| 5,337,351 | A |   | 8/1994  | Manabe et al. ............. 379/201 |
| 5,404,396 | A | * | 4/1995  | Brennan ...................... 379/201 |
| 5,448,631 | A |   | 9/1995  | Cain .......................... 379/201 |
| 5,657,451 | A |   | 8/1997  | Khello ........................ 379/201 |
| 5,920,618 | A | * | 7/1999  | Fleischer, III et al. ...... 379/207 |
| 5,999,610 | A | * | 12/1999 | Lin et al. .................... 379/201 |
| 6,080,202 | A | * | 6/2000  | Strickland et al. ............ 703/27 |
| 6,104,803 | A | * | 8/2000  | Weser et al. ................ 379/230 |
| 6,141,407 | A | * | 10/2000 | Fritsche ...................... 379/201 |
| 6,167,064 | A | * | 12/2000 | Cohn et al. ................. 370/522 |
| 6,175,618 | B1| * | 1/2001  | Shah et al. ................. 379/201 |
| 6,185,519 | B1| * | 2/2001  | Lin et al. ...................... 703/21 |
| 6,205,214 | B1| * | 3/2001  | Culli et al. ................. 379/220 |
| 6,226,373 | B1| * | 5/2001  | Zhu et al. ................... 379/207 |
| 6,442,267 | B2| * | 8/2002  | Culli et al. ............. 379/220.01 |
| 6,526,134 | B1| * | 2/2003  | Wallenius .............. 379/201.01 |

FOREIGN PATENT DOCUMENTS

| DE |   4433878 A1 | 3/1996 |
| EP |   0509705 A2 | 10/1992 |
| WO | WO 95/07593 | 3/1995 |
| WO | WO 95/22222 | 8/1995 |

OTHER PUBLICATIONS

Rydman, P., International Search Report, International App. No. PCT/SE99/00013, May 12, 1999, pp. 1–3.

* cited by examiner

Primary Examiner—Creighton Smith

(57) ABSTRACT

The present invention relates to a feature agent (20), a central control unit in an exchange in a telecommunication network, an exchange and a telephone network all comprising such a feature agent, a computer program product for realizing such a feature agent as well as a method of controlling the process flow between and through a number of features (22, 24, 26) subscribing to a certain event. The feature agent receives, in an event receiver (30), the event, selects, in a selector (32) and from an encountered control point of the process flow, a feature (22) having the highest priority from a list (list 1) comprising features of differing priorities to said event and to the combination of control points including at least the encountered control point and hands over control of the process flow to that feature for continuing the process flow in the selected feature.

27 Claims, 5 Drawing Sheets

METHOD AND DEVICES RELATED TO FEATURES OR FEATURE AGENT AND METHOD OF CONTROLLING PROCESS FLOW BETWEEN FEATURES

TECHNICAL FIELD

The present invention relates to the field of control of process flow between a number of features. More particularly the invention relates to a feature agent for such control, a central control unit in an exchange in a telecommunication network, an exchange comprising such a central control unit and a telephone network all comprising such a feature agent, a computer program product comprising means for realizing such a feature agent as well as a method of controlling a process flow between and through a number of features.

DESCRIPTION OF RELATED ART

A feature can in the art of telecommunication be an additional service which an operator provides to its customers in addition to the ordinary service of setting up telecommunication connections. When more than one such additional feature is provided there exists a problem of solving the relations between these features, i.e. which feature is to take precedence over another feature. There exists several documents describing how to solve competition between features.

U.S. Pat. No. 5,448,631 describes a central way of handling features. A feature manager runs, for a process, through a number of program steps for handling which feature is to be called. The feature manager receives an event from a basic call process and sends it to all features that are interested in the event. It receives messages from all these features and formulates a call processor response from these received messages, which response is returned to the basic call process. Thus several process flows are started and the result of one of these flows is reported.

U.S. Pat. No. 5,337,351 also describes a central process for handling which feature is to be called. When a conflict arises between features said process is called for comparing different criteria for features. The process decides which feature is to be called in dependence of these criteria. It is in this case also a question about a central and complicated decision process, which solves a conflict between two features.

WO95/07593 generally describes different sets of rules for disconnecting a feature which has been activated in a process in connection with a certain event. Conflicts between features, already activated or pending, are solved through a decision process consisting of different branch instructions. What is described here is thus also solving of conflicts between two features.

WO95/22222 also describes a centralized process for detection and solving conflicts between features.

All above mentioned documents are thus related to central decision logic for solving conflicts between two features, when such conflicts arise or for selecting the result of one feature in dependence of a conflict.

Above mentioned document WO95/22222 also shortly mentions, in the section titled description of related art, that simple interaction logic between features, or as they are called there supplementary functions, can be handled by tables and that interactions are controlled by priorities.

As stated above this document only describes this simple interaction logic shortly and related technical literature, like the ETSI GSM Technical Specification GSM 02.04, "European digital cellular telecommunication system (phase 1); General on Supplementary Services", mentions that priorities are used for solving conflicts between different supplementary services. The above GSM document, which is a general specification, also contains a table showing, for each of a number of additional services, which other additional service that particular additional service can interact with.

In ETSI Technical Specification GSM 02.83, "Digital cellular telecommunications system; Call Waiting (CW) and Call Holding (HOLD) Supplementary Services—Stage 1", which is in the same series of specifications as above mentioned general specification, the interactions between a number of additional services are specified. This specification only lists how for example the feature Call Waiting is allowed to interact with for example Call hold. Sometimes a priority is given, but not always. What is described here is also more of how features interact, but then never for more than two at a time. What is described is thus more of the solution of a conflict between two features.

SUMMARY OF THE INVENTION

The present invention is directed to solving the problem of providing a simple, flexible and efficient way of controlling a process flow between different features subscribing to an event.

This problem is solved by a feature agent that receives the event, selects, in an encountered control point of the process flow, a feature having the highest priority from a list comprising features of differing priorities subscribing to said event and to the combination of control points including at least the encountered control point and hands over control of the process flow to that feature for continuing the process flow in the selected feature.

One object of the present invention is to provide a simple, flexible and efficient method of controlling a process flow between and through a number of features subscribing to an event in a telecommunication network.

This object is achieved by a method comprising the steps of receiving the event, marking a starting control point of the flow, selecting, in an encountered control point of the process flow, a feature having the highest priority from a list comprising features of differing priorities subscribing to said event and to the combination of control points including at least the encountered control point and handing over control of the process flow to that feature, so that the process flow can continue in the selected feature.

Another object of the present invention is to provide a feature agent, a central control unit in an exchange in a telecommunication network, an exchange and a telephone network all comprising such a feature agent, where the feature agent provides a simple, flexible and efficient way of controlling the process flow between different features subscribing to an event.

This object is solved by a feature agent, a central control unit in an exchange in a telecommunication network, an exchange and a telephone network, where the feature agent comprises means for receiving the event, which event marks a starting control point of the flow, and means for selecting, in at least one encountered control point of the process flow, a feature which is to take over control of the process flow. The feature agent includes or has access to, for at least one possible control point within the flow, at least one separate list specific for the event and a combination of control points including at least the encountered control point, said list comprising features of differing priorities subscribing to said event and to the combination of control points, and the means for selecting a feature is arranged, for said encountered control point, to select the feature which has the highest priority in the corresponding list and hand over control of the process flow to that feature so that the process flow can continue in that feature.

Another object of the present invention is to provide a computer program product comprising means for realizing a feature agent, where the feature agent provides a simple, flexible and efficient way of controlling the process flow between different features subscribing to an event.

This object is solved by a computer program product comprising a computer usable storage medium having computer program code embodied in said medium for causing the assembly of sets of executable computer instructions to provide control of telecommunication services in or for an exchange, where the exchange comprises or has access to at least two features for performing separate telecommunication services. The computer program product comprises means for organizing sets of executable computer instructions into a feature agent for controlling a process flow between and through a number of features subscribing to a certain event, so that the feature agent comprises means for receiving an event, which event marks a starting control point of the flow, and means for selecting, in at least one encountered control point of the process flow, a feature which is to take over control of the process flow. The feature agent includes or has access to, for at least one possible control point within the flow, at least one separate list specific for the event and a combination of control points including at least the encountered control point, said list comprising features of differing priorities subscribing to said event and to the combination of control points, and the means for selecting a feature is arranged, for said encountered control point, to select the feature which has the highest priority in the corresponding list and hand over control of the process flow to that feature, so that the process flow continues in that feature.

One advantage of the present invention is that it provides simple and effective control of the process flow between different features.

Because of the modularity of the invention, where features only communicate with each other via a feature agent, the features become independent of each other. In this way construction of new features to be added to a process control system is much simplified. Testing of a process control system is also simplified since one can test the interworking of a few features and then stepwise increase the number of features until all the features in the process control system are provided. In conventional process control systems, like for instance telecommunication systems, one commonly has to test a whole system at one time, which makes the identification of errors in the interworking of features harder. The invention also provides for simpler construction of a process control system in that not all features might need to be provided simultaneously but some features can be provided later. In this way a process control system can be delivered before all the features to be implemented in it are actually there and these features can then be provided later.

A feature according to the present invention is more than an additional feature mentioned in the prior art and can include several other types of services like the setting up of a telephone call.

The invention will now be described in more detail using preferred embodiments and with reference being made to the appended drawings.

DETAILED DESCRIPTION OF PREFERRED EMBODIMENTS

Figure 1:
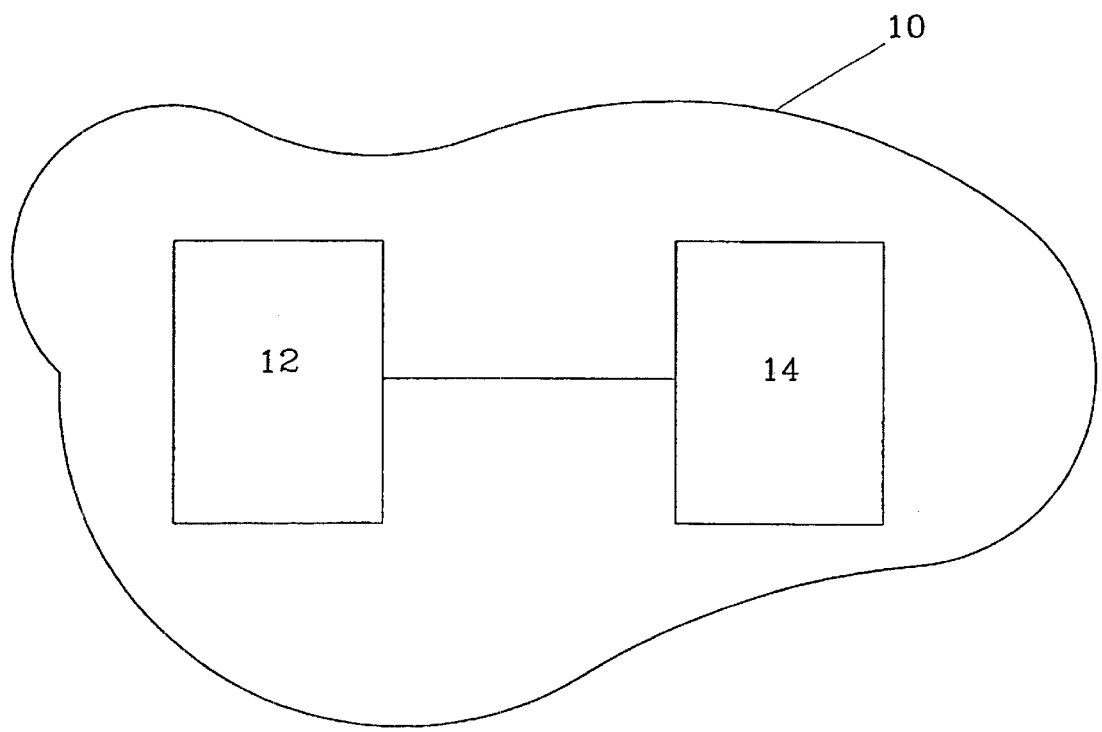
FIG. 1 shows a telecommunication network according to the invention.

FIG. 1 shows a very simple telecommunication network 10 comprising two exchanges 12 and 14. The network is, in the described embodiment, a private telecommunication network. The invention is not limited to such a network, but can be implemented in any telecommunication network like for instance a public telecommunication network such as PSTN (Public Switched Telephone Network), PLMN (Public Land Mobile Network) or ISDN (Integrated Services Digital Network). The private network can also be a normal private network comprising a number of private branch exchanges (PBX) but can also be a private network handling mobility, like a network handling DECT terminals or other mobile terminals. It can of course also be a combination of such networks. It should furthermore be understood that the invention is not limited to a telecommunication network, but can also be applied on for example a data network. What is essential for the invention is that it includes a system for handling processes where a process can take different directions. In the figure only two exchanges are shown connected to each other. The network can of course include several such exchanges connected to each other either directly or via some public network like PSTN.

Figure 2:
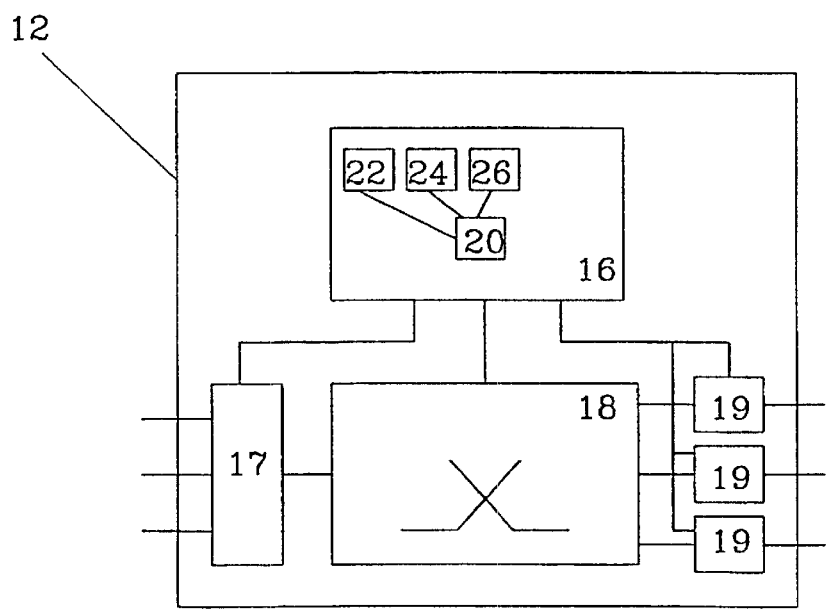
FIG. 2 shows a block schematic of an exchange in the telecommunication network according to FIG. 1.

FIG. 2 shows a first exchange 12 in the network of FIG. 1. This exchange comprises a switch core 18 and a central control unit 16. The switch core is connected to a number of telecommunication lines which are either so called trunk lines for connecting the exchange to the other exchange in the private network or extension lines for connection to telephone sets or other types of terminals. These lines are connected to the switch core via different hardware boards, extension line unit 17 for the extension lines and trunk line units 19 for the trunk lines, where a trunk line unit 19 is provided for each trunk line and an extension line unit 17 is provided for more than one extension line. When a user of a telephone set lifts his phone off the hook or when signals are received on a signaling channel on a trunk line this is sensed by the appropriate line unit. The line units report such events to the central control unit 16, which then performs appropriate measures like performing signaling or setting up a connection through the switch core 18. How this is done is something well known within the art of telecommunication and need not be further disclosed here. The signaling and setting up connections is however controlled in features and the interworking of features will be further described below. The number of line units provided for extensions can of course be varied in many ways.

The setting up of connections and handling of additional services is as stated above controlled by the central control unit 16. This central control unit comprises a feature agent 20 to which four different features 22, 24 and 26 are connected. It should be realized that the number of features shown is only made in order to simplify the understanding of the invention. In reality several more features are generally provided. There are furthermore so that the shown feature agent and features are provided for only one process, such as the process of making or receiving a telephone call and every such process would thus have its own feature agent and group of features. The central control unit is normally provided on one separate hardware board having one or more processors and associated memories. Each line unit reports events to a feature agent for controlling a process. In the preferred embodiment the central control unit is provided as a number of software modules written in a declarative programming language, which in the preferred embodiment is Erlang, (described in "Erlang—A new programming Language" by B. Däcker, Ericsson review No. 2, 1993 and "Prototyping Cordless Using Declarative Programming by I. Ahlberg, J-O. Bauner and A. Danne, Ericsson review No. 2, 1993). The different modules report events to the central control unit as calls made in Erlang. How this can be done is for instance described in the Swedish patent application SE9800037-5.

The switch control function is to set up telecommunication paths through the switch core connecting telephone sets with a trunk line. All this is something well known to the man skilled in the art.

The switch core need not be of the type shown in FIG. 2, but could just as well have a distributed switch core where several boards receiving trunk line and/or extension line traffic are connected in a ring. In that case no line units would be provided, but each such board in the ring would report events to the central control unit. Such a construction is described in the international application PCT/SE97/02085.

There are several different types of features that can exist in the central control unit. One such feature is a basic call function, i.e. the function to set up a call, which is provided in an Erlang module. Normally a feature is provided for each action performed in a telecommunication exchange. Other features that can be provided are so called additional features. Of these there exist several, like presentation of number of calling party, call waiting, different types of call forwarding, Call Hold, multiparty services, barring of calls as well as charging information etc. A feature can also be provided for handling competition between features. The above mentioned features are just a few of all the possible features that can be provided. In the present invention a whole such service is normally provided in a feature module written in Erlang, but a feature can also occupy more than one feature module, i.e. sometimes one feature module can comprise only part of a feature.

Figure 7:
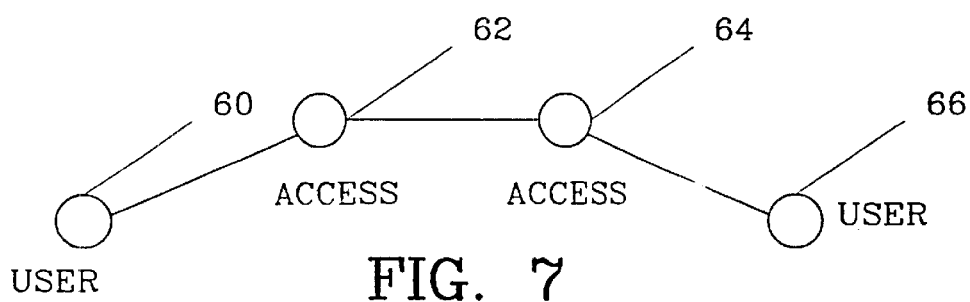

FIG. 7 shows a schematic view of a model for showing the dependencies of different feature agents according to the invention. The model comprises four different points where all these points are associated with one process in the telecommunication network of FIG. 1. The process can include above mentioned basic function of setting up a call. FIG. 7 shows a first point 60 associated with a user, like perhaps a user of a telephone set connected to the first exchange of FIG. 1, a second point 62 associated with access to the line units of the first switch 12 of FIG. 1, i.e. the hardware where off-hook, signaling and other events are detected in the first exchange. The second point 62 is connected to a third point 64 associated with access to the hardware of the second exchange. The third point 64 is finally connected to a fourth point 66 associated with the user of the second exchange.

The feature agent shown in FIG. 2 is an access feature agent and only handles features associated with setting up calls. This feature agent might generate events which are submitted to a user feature agent associated with the first point. If a call is to be set up from the first exchange to the second exchange this first access feature agent 20 would turn control over to a signaling feature, controlling the signaling. The signaling feature would then control signaling performed on a trunk line connecting the first and the second exchanges such that signaling information is received in a trunk line unit of the second exchange. In dependence of which network is used for connecting the exchanges different signaling protocols would be used and therefore different signaling features could be chosen. A second access feature agent belonging to the second exchange would receive an event from this trunk line unit in response to the signaling and would in turn also generate events to be sent to a second user feature agent associated with a user connected to the second exchange, to which a connection is to be set up. A feature agent associated with one point in FIG. 7 then handles one process flow and one process flow can generate another process flow controlled by another feature agent. The access feature agent handles features associated with the call process and the hardware in the exchange. The user type features includes features associated with the actual user, like for handling subscriber, name and number. If the network handles DECT type mobility there are different features associated with the user if the user has a mobile terminal visiting a node or exchange or if the terminal belongs to the exchange. User type features can also comprise features determining if the user is allowed to place long distance calls.

Another type of feature agent might be a feature agent handling above mentioned additional services such as call forwarding. This feature agent would then receive events from one of above mentioned user or access feature agents.

The model in FIG. 7 is applicable for one connection only, so basically every connection set up in above described manner between the two exchanges has at least these four different feature agents and processes associated with itself. Feature agents according to the invention might of course also only be provided in one of the exchanges in FIG. 1. The model in FIG. 7 is furthermore described in more detail in U.S. Pat. No. 5,572,727, which document is herein incorporated by reference.

Figure 3:
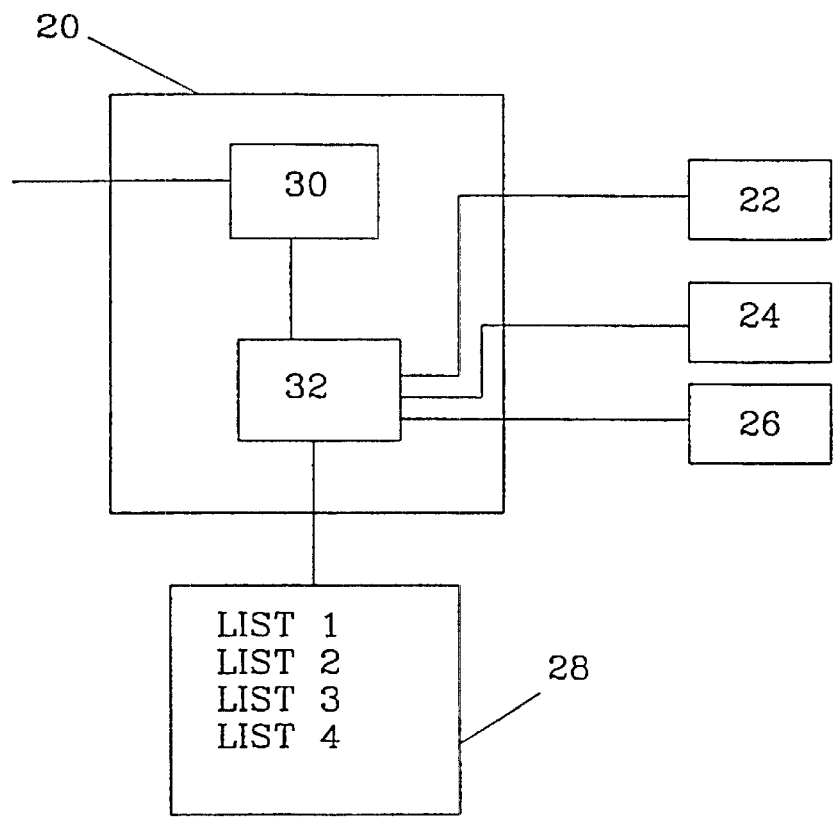
FIG. 3 shows part of a central control unit comprising a feature agent according to the invention.

FIG. 3 shows a block schematic of the feature agent 20 according to the invention being connected to a table 28 containing lists LIST1, LIST2, LIST3 and LIST4 of features. Each such list comprises information about a priority order between the features in the list. Normally the feature first in the list has the highest priority, but other ways of indicating priority is possible. The feature agent 20 comprises a means for selecting or a selector 32 connected to the table 28 and to three different feature modules 22, 24 and 26. The feature agent 20 also comprises a means for receiving/transmitting events 30 or a combined event receiver and event sender. In the present example the feature agent 20 is an access feature agent and therefore the means for receiving/transmitting events 30 receive such events from different line units described in relation to FIG. 2. There is at least one list associated with every possible point in a process flow. A feature agent can in dependence of the flow create an event for sending to another feature agent. This creation can be performed because of some inner event occuring within a feature, where this feature then might order the feature agent to generate an event or to perform a time measurement which in turn might lead to the generation of an event. Therefore the means for receiving/transmitting events 30 is also capable of sending events to other feature agents. The information transmitted between two different feature agents can then be sent from one feature agent to another in different ways. One feature agent can send an event and stop the process flow among the features connected to it in dependence of a reply or generate an event for the other feature agent and continue working independently of the processing in the other process flow. The feature agent and the features are, in the preferred embodiments provided in the form of Erlang modules. Therefore the feature agent comprises a number of processing steps and is called by the features as well as by the hardware.

The table 28 is shown as being outside the feature agent. It could however of course also be a part of the feature agent.

Figure 4:
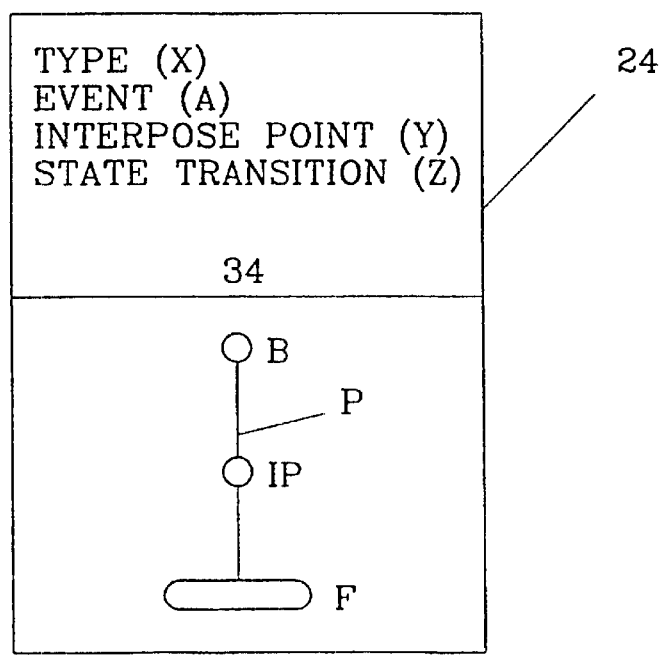
FIG. 4 shows a simplified feature.

FIG. 4 shows the general structure of a feature. A feature comprises a heading section comprising a declaration of type (x) indicating which type of feature it is, i.e. whether it is an access or user type. The type could of course also be of the additional service type. The heading section also comprises a declaration of event (a), which indicates which event the feature subscribes to, i.e. for which event it might be included in a process flow. A further declaration is interpose point (y), which is a point within a possible flow running through another feature from which the present feature might want to take over control. The final declaration is state transition (z), whereby the feature declares a state transition for a point in a flow in another feature agent to which it subscribes. The figure goes on to show, in a portion below the heading section the track of a process P, i.e. how a partial process might flow within the feature. The track includes a beginning point B. This is a point in which the process might start to flow if the feature is included in the process flow. The track continues to an interpose point IP which is a point that is returned to the feature agent for possible change of the flow. The track finally includes a finishing point F, where the processing is finished and control is returned to the feature agent.

Above shown process P can be seen as a track which the process flow can follow and the interpose point IP marks a crossroads in the track where the flow can take another path and follow a track in another feature. For the sake of simplicity no point was included where a changed state was indicated, but such a point might of course also lead to a changed choice of track to follow. An interpose point is a point provided by the designer of a feature and is just a normal point in the flow from which another feature might want to take over control, perhaps because of a conflict. A state transition point is a point showing that something has actually been performed in a feature.

The process P is fairly simple to realize as a number of processing steps in an Erlang module. The interpose point and state transition points would then easily be realized as functions calling the feature agent using the interpose points or state transition points with the changed states as arguments.

Figure 5:
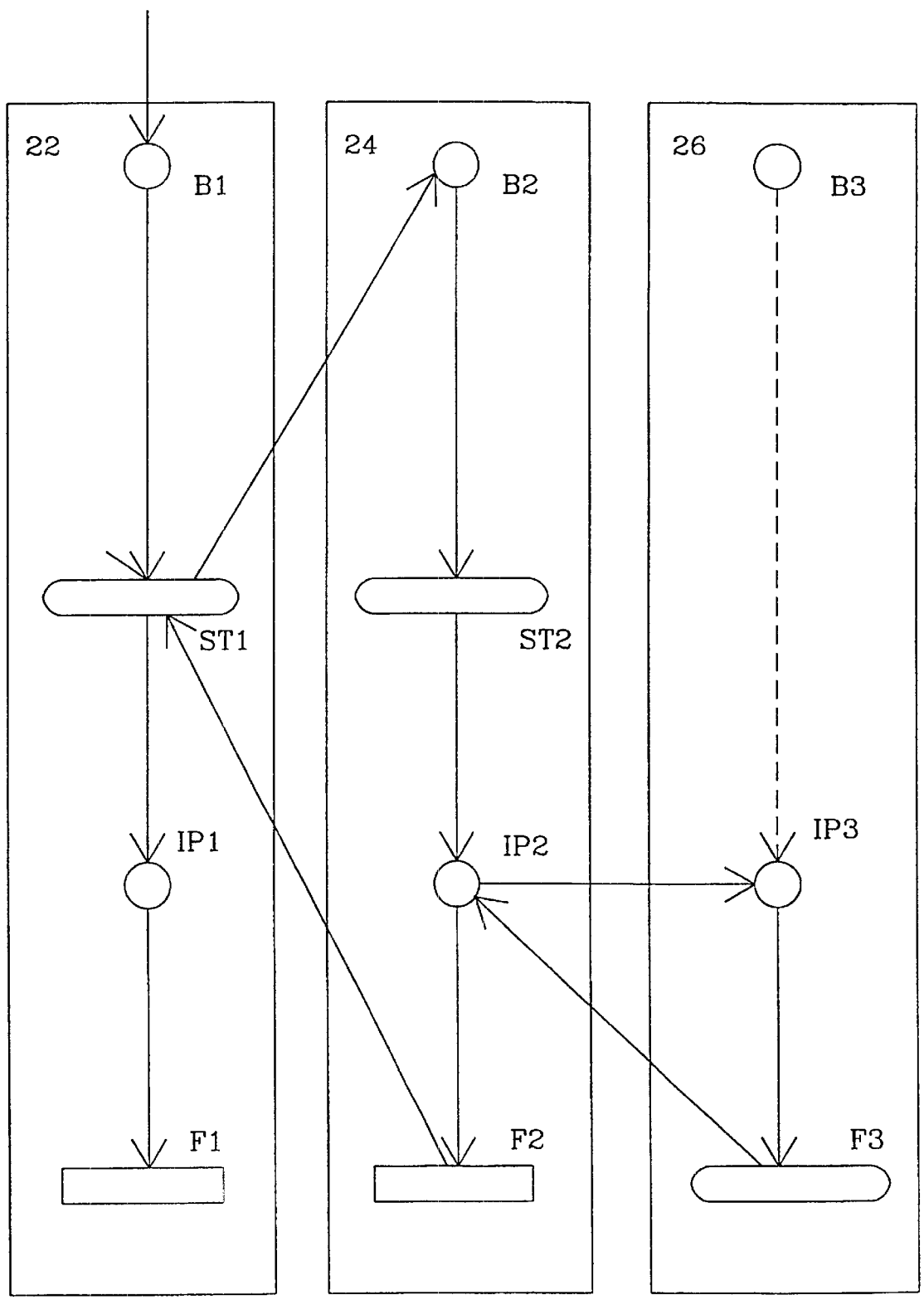
FIG. 5 shows a simplified process flow through three different features.

FIG. 5 shows a process flow through three of the features 22, 24 and 26. The first feature 22 includes a first beginning or starting point B1 receiving an event from outside the feature.

The first feature 22 comprises a first track of several computational steps which from the first starting point B1 lead to a state transition point ST1, this is a point in which a state transition might occur and a list is provided in the feature agent for every possible state that can be obtained for this point. In the figure the first track is shown to continue from the first state transition point ST1 to a first interpose point IP1 in the first feature 22 and from there to a finishing point F1 in the first feature 22. The second feature has a second beginning point B2 to which a second track leads from the first state transition point ST1 in the first feature 22. A third track within the second feature 24 is shown as leading from the second beginning point B2 to a second state transition point ST2 and from there to a second interpose point IP2 within the second feature. The third track then runs from the second interpose point IP2 to a second finishing point F2 in the second feature. A fourth track runs from the second finishing point F2 to the first state transition point ST1 in the first feature 22. The third feature 26 comprises a third beginning or starting point B3, which has a fifth track first shown in dashed lines to a third interpose point IP3 in the third feature, and from there in a solid line to a third finishing point within the third feature 26. A sixth track runs from the second interpose point IP2 in the second feature 24 to the third interpose point IP3 in the third feature 26. Finally a seventh track is shown running from the third finishing point F3 in the third feature to the second interpose point IP2 in the second feature 24. All tracks but the fifth track are always shown with solid lines.

Figure 6A:
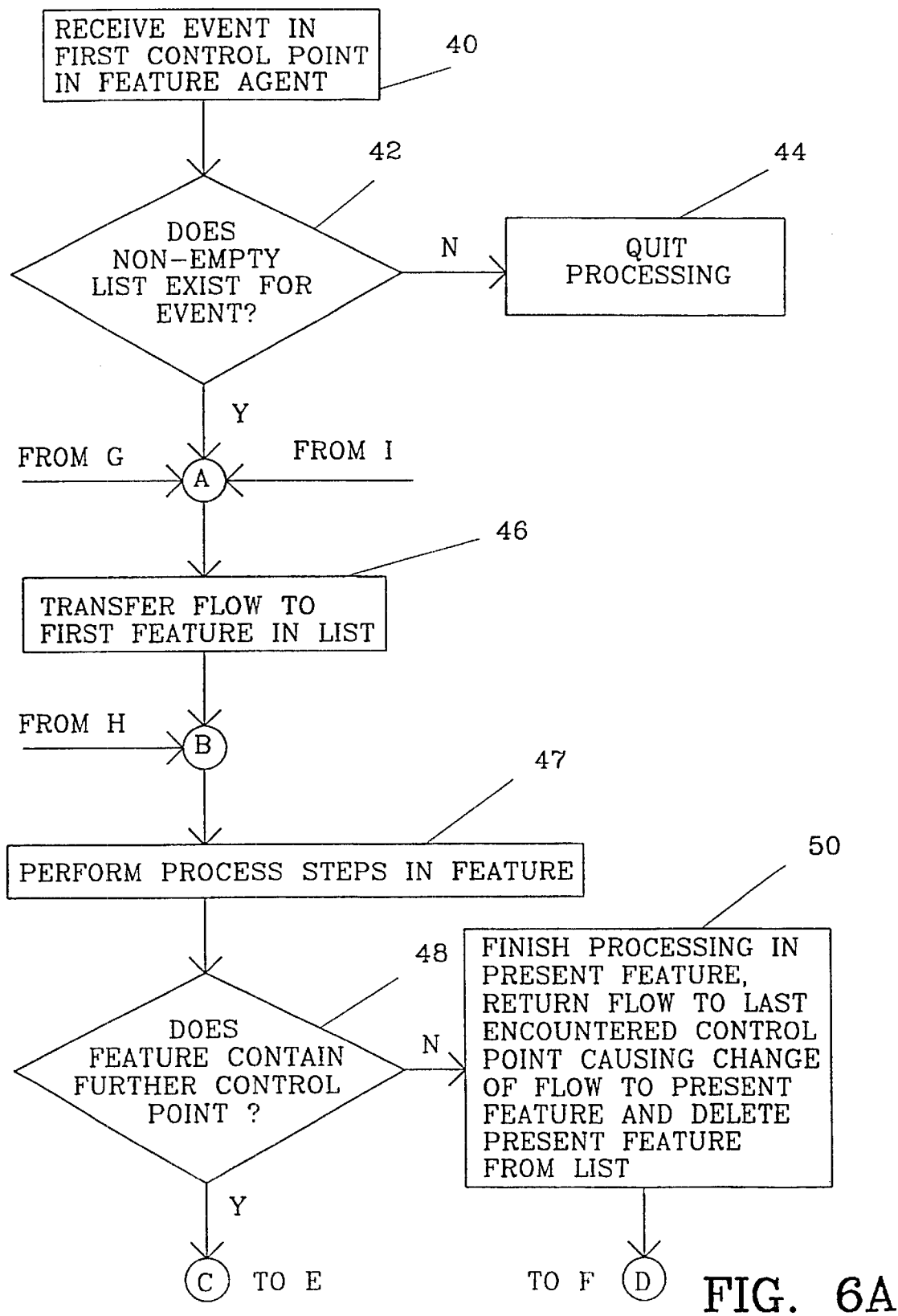
FIG. 6A shows a first part of a flow chart depicting a method of controlling the process flow according to the invention.
Figure 6B:
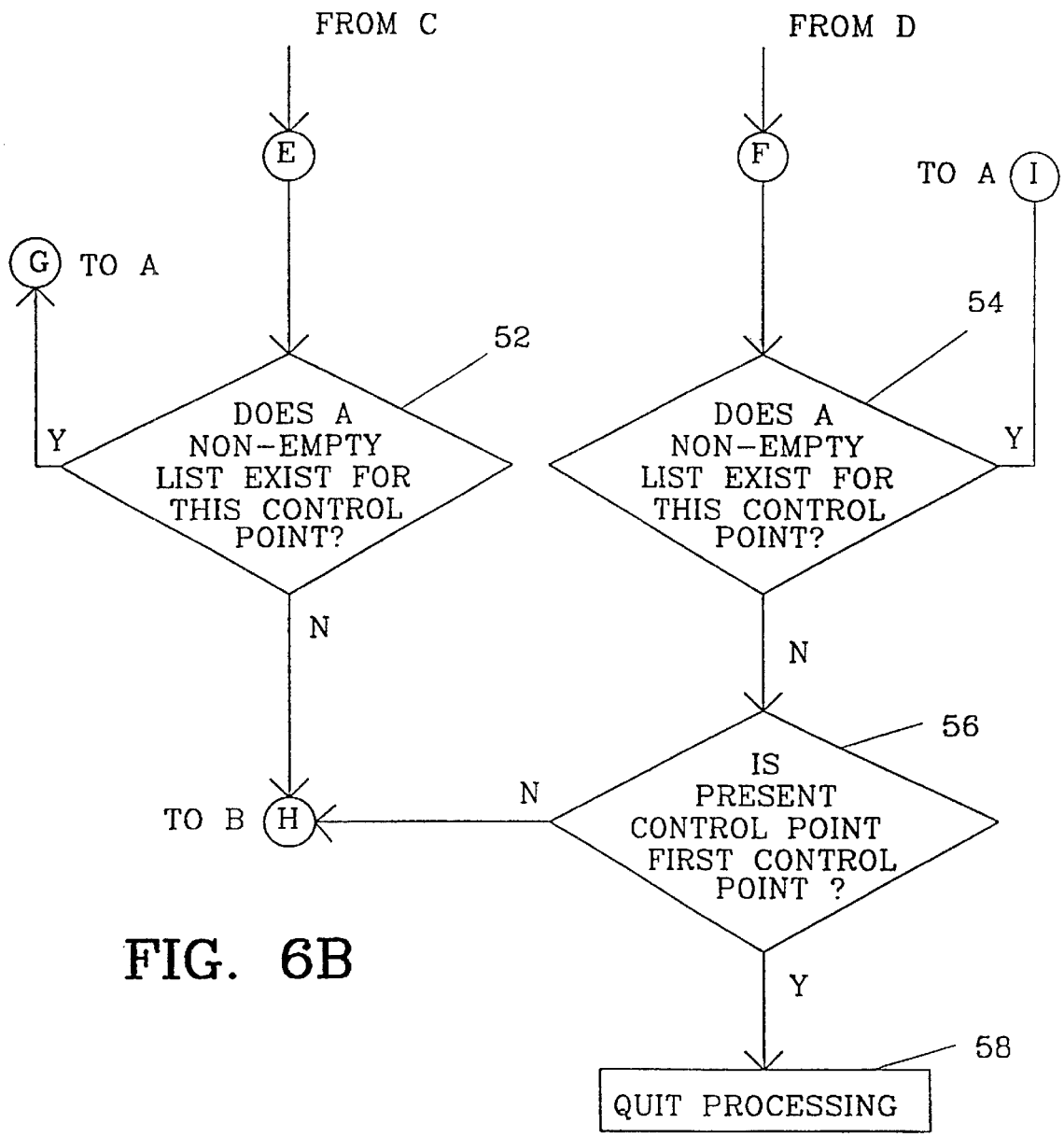
FIG. 6B shows a second part of the flow chart depicting the method of controlling the process flow according to the invention and FIG. 7 shows the relation between different feature agents in a network according to FIG. 1.

The control of the process flow shown in FIG. 5 will now be described using the method shown in FIG. 6. During the description reference will be made to FIGS. 3, 5 and 6.

The process flow is a single, unitary and undivided process flow, i.e. the process flow never splits up, but runs from one feature to the other. First of all the feature agent 20 receives an event in the event transceiver 30, which event in this example is an event generated by one line unit in the exchange of FIG. 2. The event can be reported by way of a so called call-back function. The call-back function is described in more detail in above mentioned Swedish patent application SE9800037-5. The feature agent to be called by a line unit can alternatively be hardcoded into the hardware of the line unit, perhaps by using a table provided in the line unit. The feature agent forwards the event to the selector 32. This marks a first or starting control point of the process flow. The event is thus received in the first control point in the feature agent, procedural step 40. For this starting point, the selector selects the list, list1, associated with this starting point and transfers the process flow to the feature which has the highest priority in the list, procedural step 46, if the first list was not empty, procedural step 42. The feature having the highest priority is the one first in the list and is in this case the first feature 22. Since the first feature is an Erlang module the transferring is done by calling that module with a calling function using the access type and event as arguments. In dependence of these arguments the first feature 22 selects where the process is to start flowing within the feature. In the present example that point is the first beginning point B1. If the list had been empty, i.e. no features were subscribing to the list or if alternatively no list existed for the event, procedural step 42, the process flow would stop and nothing be done, procedural step 44.

Thereafter the process flow continues running through the first feature in the first track, i.e. a number of process steps are performed in the first feature, procedural step 47. After a few ordinary process steps a control point in the flow is encountered in the form of a process step ST1 where a state transition occurs, procedural step 48. The state transition point and its state is returned to the feature agent, which selects a second list, list2, associated with the point and its state. If this list is not empty, procedural step 52, the selector thereafter transfers the process flow to the feature first in that list, procedural step 46, which feature is the second feature 24. If the second list is empty or nonexistent, procedural step 52, the process would continue to flow in the first feature and perform further process steps, procedural step 47.

As a state transition point can have two or more different states, there is one list for each state. In the present example the state transition point has two states and the third list, list3, is associated with the other state. Since the point does not have this state the third list is not selected in the selector.

As stated above the selector 32 directs the flow to the second feature 24. Since the second feature is an Erlang module this is done by calling that module using the type, event, state transition point and the state of the state transition point as arguments. In dependence of these arguments the second feature selects where the process is to continue flowing within the second feature. The point of entry is here the second beginning point B2. Thereafter the second feature starts processing in the same way as the first feature had previously been processed by running through a number of processing steps in the third track, procedural step 47. During the processing a second state transition point was encountered, procedural step 48. The second feature then forwards this point and its state to the selector 32 of the feature agent 20 for checking of a table. However no table existed for this state, procedural step 52, and the flow therefore continues to flow within the second feature.

After a few new processing steps, procedural step 47, a new control point in the form of the second interpose point IP2 is encountered in the second feature, procedural step 48, and therefore that point is forwarded to the selector 32, which looks in the table 28 and selects the fourth list, list4, which is associated with this interpose point, procedural step 52. The feature first in that list is the third feature 26 and therefore the selector directs the flow to the third feature, procedural step 46. This is done by calling the Erlang module in which the feature is provided using the type, event, state transition point ST1 with its state and interpose point as arguments. In dependence of these arguments the third feature 26 selects where the process is to start flowing within the feature. The point of entry is here the third interpose point IP3. A number of process steps in the fifth track from the third beginning point B3 to the third interpose point IP3 within the third feature are thus not included in the process flow. The flow continues within the third feature 26, procedural step 47, and no more control points are encountered, procedural step 48, why the third feature runs to the third finishing point F3. Control of the flow is now handed back to the selector 32, which goes on to check for the next feature in the list, list4, associated with the second interpose point IP2, procedural step 50. This could be arranged by deleting the feature first in the list and go to a new first feature in the list or by providing a pointer or counter for the list, where the pointer or counter is incremented in order to point out the feature having the next highest priority. There are several ways this can be done that can be contemplated by the skilled man in the art.

In the present example the fourth list only contained one feature, the third feature, why the list is considered empty, procedural step 54. The feature agent then lets the process flow continue from the second interpose point IP2 of the second feature 24 after checking that the second interpose point was not the first control point, procedural step 56. A number of process steps are then performed in the second feature, procedural step 47. Thereafter no further control points are encountered in the second feature, procedural step 48, why procedural step 50 is repeated for the second feature and the flow is therefore returned to the state transition point ST1 of the first feature.

At this point the state of the first state transition point ST1 could have changed because of the processing in the second and third features. In that case the first feature in the third list, list3, might take over the process flow. In the present case no such change however occurred and the second list is therefore still valid for the first state transition point ST1. This list is in the present example now also empty, procedural step 54, why the flow is directed to continue in the first feature, procedural steps 54, 56 and 47. In this flow the first interpose point IP1 is encountered, procedural step 48, but no list with features are associated with this point, procedural step 52, why the process continues to flow within the first feature.

At this point in time the first feature does not contain any more control points, procedural step 48, why the feature stops processing and control is returned to the first control point within the feature agent, procedural step 50. The first list is now again consulted. In the present example it is now empty, procedural step 54, and since the control point is the first control point, procedural step 56, the processing of the event is now ended, procedural step 58.

Each list described above only comprised one feature each, which is a simplification of the invention in order to describe the functioning. In reality several features could be included in a list.

A feature does not have to run to the end as described above, but can be interrupted before it is finished. Control need also not be returned to a previous feature from which it was handed over to a new feature, but processing can stop while the flow is right in the middle of that new feature. There is thus a big flexibility in the system.

A control point in a feature might of course not be passed by the process. Therefore there are several possible control points for a process flow, but for a certain event perhaps only some of them are passed by the flow.

Described above was a process flow containing a first state transition point, where the flow was directed from the first to the second feature because of the state of the state transition point. Had the state transition point had another state, the flow could have been directed elsewhere or continued to run in the first feature. In such a flow associated with the other state a control point in the above described flow might have been encountered, like for instance the second interpose point. For the flow taking this other course the second interpose point would then have another list associated with itself and then that other flow would perhaps be directed back to the first feature from the second interpose point. One can therefore see the feature agent as directing the control of the flow to a certain feature in a list in dependence of the event and a group of control points, which group comprises at least one control point. For the start of the flow there obviously only exists one control point in the group, while at the end there can be several such control points in the group. The feature agent easily keeps track of encountered control points and the possible states since these are reported from the features and there is thus one list for every such combination.

A control point does not have to be included in the middle of a feature. A finishing point of a feature can also be a control point. This finishing point can also have different states.

The invention concerns the control of single, unitary and undivided process flows, where one feature agent is provided for each process flow, unlike in the document U.S. Pat. No. 5,448,631 which is concerned with the selection of the result obtained in one process flow out of several parallel process flows. What has been described is furthermore a feature agent which directs the process flow between different features in dependence of event and at least one process control point. This control is simple, flexible and efficient. The solving of conflicts between features as outlined in the prior art section of this application is in the present invention solved within the features. Each feature can then include some conflict solving functions. As an alternative one or more separate conflict solving features can be provided. The system has been described in relation to a telecommunication network, but it is not limited thereto. It can be used in any system where the coordination between features is desirable.

Because of the modularity of the invention, where features only communicate with each other via a feature agent, the features become independent of each other. In this way construction of new features to be added to a process control system is much simplified. Testing of a process control system is also simplified since one can test the interworking of a few features and then stepwise increase the number of features until all the features in the process control system are provided. In conventional process control systems, like for instance telecommunication systems, one commonly has to test a whole system at one time, which makes the identification of errors in the interworking of features harder. The invention also provides for simpler construction of a process control system in that not all features might need to be provided simultaneously but some features can be provided later. In this way a process control system can be delivered before all the features to be implemented in it are actually there and these features can then be provided later.

The feature agent can also be provided on a computer program product or data carrier such as a CD-ROM or a diskette to be implemented in the central control unit of an exchange.

The invention was described using Erlang modules. The invention is of course not limited to Erlang, but any programming language that allows modularity that is capable of providing different features and a feature agent can of course be used.

Features and feature agents can be provided in a node outside an exchange and could in that case receive an event from an exchange connected to this node.

The invention is of course not limited to the embodiment described above and shown in the drawings, but can be varied within the scope of the appended claims.

What is claimed is:

1. Feature agent (20) for controlling a process flow between and through a number of features (22, 24, 26) subscribing to a certain event and comprising means (30) for receiving the event, which event marks a starting control point of the flow, and means (32) for selecting, in at least one encountered control point (ST1, IP1, ST2, IP2, IP3) of the process flow, a feature which is to take over control of the process flow, characterized in that the feature agent includes or has access to, for at least one possible control point within the flow, at least one separate list (list1, list2, list3, list4) specific for the event and a combination of control points including at least the encountered control point, said list comprising features of differing priorities subscribing to said event and to the combination of control points, and in that the means for selecting a feature is arranged, for said encountered control point, to select the feature which has the highest priority in the corresponding list and hand over control of the process flow to that feature so that the process flow can continue in that feature.

2. Feature agent according to claim 1, wherein a control point (ST1) in the process flow can have different states and a list (list2, list3) is provided for each possible state for that control point.

3. Feature agent according to claim 2, wherein a control point in the flow having different states is the end point of a feature.

4. Feature agent according to any previous claim, wherein the feature agent subscribes to an event generated by another feature agent.

5. Feature agent according to any previous claim, wherein the process flow comprises at least two control points of which at least one control point is provided within a feature and a selection is performed for the control point within a feature.

6. Feature agent according to any previous claim, wherein the process flow is an undivided process flow.

7. Feature agent according to any previous claim, wherein the process flow is a telecommunication process flow for handling features associated with telecommunication services.

8. Feature agent according to any previous claim, wherein the feature agent and the features are arranged to be provided in or for the central control unit (16) of an exchange (12) in a telecommunication network (10).

9. Central control unit (16) for use in an exchange (12) in a telecommunication network (10) and comprising at least two features (22, 24, 26) as well as a feature agent (20) for controlling a process flow between and through a number of features subscribing to a certain event, wherein the feature agent comprises means (30) for receiving an event, which event marks a starting control point of the flow, and means (32) for selecting, in at least one encountered control point (ST1, IP1, ST2, IP2, IP3) of the process flow, a feature (22, 24, 26) which is to take over control of the process flow, characterized in that the feature agent includes or has access to, for at least one possible control point within the flow, at least one separate list (list1, list2, list3, list4) specific for the event and a combination of control points including at least the encountered control point, said list comprising features of differing priorities subscribing to said event and to the combination of control points, and in that the means for selecting a feature is arranged, for said encountered control point, to select the feature which has the highest priority in the corresponding list and hand over control of the process flow to that feature, so that the process flow continues in that feature.

10. Exchange (12) for connection in a telecommunication network (10) and comprising at least two features (22, 24, 26) as well as a feature agent (20) for controlling a process flow between and through a number of features subscribing to a certain event, wherein the feature agent comprises means (30) for receiving an event generated in the exchange, which event marks a starting control point of the flow, and means (32) for selecting, in at least one encountered control point (ST1, IP1, ST2, IP2, IP3) of the process flow, a feature which is to take over control of the process flow, characterized in that the feature agent
  includes or has access to, for at least one possible control point within the flow, at least one separate list (list1, list2, list3, list4) specific for the event and a combination of control points including at least the encountered control point, said list comprising features of differing priorities subscribing to said event and to the combination of control points, and
  in that the means for selecting a feature is arranged, for said encountered control point, to select the feature which has the highest priority in the corresponding list and hand over control of the process flow to that feature, so that the process flow continues in that feature.

11. Telecommunication network (10) comprising an exchange (12) that comprises at least two features (22, 24, 26) as well as a feature agent (20) for controlling a process flow between and through a number of features subscribing to a certain event in the exchange (12), wherein the feature agent comprises means (30) for receiving an event, which event marks a starting control point of the flow, and means (32) for selecting, in at least one encountered control point (ST1, IP1, ST2, IP2, IP3) of the process flow, a feature which is to take over control of the process flow, characterized in that the feature agent
  includes or has access to, for at least one possible control point within the flow, at least one separate list (list1, list2, list3, list4) specific for the event and a combination of control points including at least the encountered control point, said list comprising features of differing priorities subscribing to said event and to the combination of control points, and
  in that the means for selecting a feature is arranged, for said encountered control point, to select the feature which has the highest priority in the corresponding list and hand over control of the process flow to that feature, so that the process flow continues in that feature.

12. Computer program product comprising:

a computer usable storage medium having computer program code embodied in said medium for causing the assembly of sets of executable computer instructions to provide control of telecommunication services in or for an exchange (12), where the exchange comprises or has access to at least two features (22, 24, 26) for performing separate telecommunication services, said computer program product comprising:
  means for organizing sets of executable computer instructions into a feature agent (22) for controlling a process flow between and through a number of features (22, 24, 26) subscribing to a certain event generated in the exchange, so that the feature agent comprises:
    means (30) for receiving an event, which event marks a starting control point of the flow, and
    means (32) for selecting, in at least one encountered control point (ST1, IP1, ST2, IP2, IP3) of the process flow, a feature which is to take over control of the process flow, where the feature agent
    includes or has access to, for at least one possible control point within the flow, at least one separate list (list1, list2, list3, list4) specific for the event and a combination of control points including at least the encountered control point, said list comprising features of differing priorities subscribing to said event and to the combination of control points, and
    the means for selecting a feature is arranged, for said encountered control point, to select the feature which has the highest priority in the corresponding list and hand over control of the process flow to that feature, so that the process flow continues in that feature.

13. Computer program product according to claim 12, wherein the computer instructions are encoded in a declarative programming language.

14. Method of controlling a process flow between and through a number of features subscribing to a certain event and comprising the steps of receiving an event, marking a starting control point of the flow, (step 40), selecting, in at least one encountered control point (ST1, IP1, ST2, IP2, IP3) of the process flow, a feature which is to take over control of the process flow, and handing over control of the process flow to that feature, (step 46)

characterized in that the step of selecting includes:
  selecting, from a list (list1, list2, list3, list4) comprising features of differing priorities subscribing to said event and to the combination of control points including at least the encountered control point, the feature that has the highest priority, so that the process flow can continue in the selected feature.

15. Method according to claim 14, wherein a control point in the process flow can have different states and a list is provided for each possible state for that control point.

16. Method according to claim 15, wherein a control point in the flow having different states is the end point of a feature.

17. Method according to any of claims 14–16, wherein the event can be an event generated in another process flow.

18. Method according to any of claims 14–17, wherein the process flow comprises at least two control points of which at least one control point is provided within a feature and a selection is performed for the control point within a feature.

19. Method according to any of claims 14–18, wherein the process flow is an undivided process flow.

20. Method according to any of claims 14–19, wherein the process flow is a telecommunication process flow for handling features associated with telecommunication services.

21. Method according to any of claims 14–20, wherein the method and the features are arranged to be provided in or for an exchange (12) in a telecommunication network (10).

22. Feature agent for controlling a process flow between and through a number of features subscribing to a certain event and comprising:

an event receiver, for receiving an event that marks a starting control point of the flow; and a selector for selecting, in at least one encountered control point of the process flow, a feature which is to take over control of the process flow;

wherein the feature agent
  includes or has access to, for at least one possible control point within the flow, at least one separate list specific for the event and a combination of control points including at least the encountered control point, said list comprising features of differing priorities subscribing to said event and to the combination of control points; and the selector is arranged, for said encountered control point, to select the feature which has the highest priority in the corresponding list and hand over control of the process flow to that feature so that the process flow can continue in that feature.

23. Central control unit for use in an exchange in a telecommunication network and comprising at least two features as well as a feature agent for controlling a process flow between and through a number of features subscribing to a certain event, wherein the feature agent comprises:

an event receiver for receiving an event that marks a starting control point of the flow; and a selector for selecting, in at least one encountered control point of the process flow, a feature which is to take over control of the process flow;

wherein the feature agent includes or has access to, for at least one possible control point within the flow, at least one separate list specific for the event and a combination of control points including at least the encountered control point, said list comprising features of differing priorities subscribing to said event and to the combination of control points; and the selector is arranged, for said encountered control point, to select the feature which has the highest priority in the corresponding list and hand over control of the process flow to that feature, so that the process flow continues in that feature.

24. Exchange for connection in a telecommunication network and comprising at least two features as well as a feature for controlling a process flow between and through a number of features subscribing to a certain event, wherein the feature agent comprises:

an event receiver for receiving an event generated in the exchange, which event marks a starting control point of the flow; and a selector for selecting, in at least one encountered control point of the process flow, a feature which is to take over control of the process flow;

wherein the feature agent includes or has access to, for at least one possible control point within the flow, at least one separate list specific for the event and a combination of control points including at least the encountered control point, said list comprising features of differing priorities subscribing to said event and to the combination of control points; and the selector is arranged, for said encountered control point, to select the feature which has the highest priority in the corresponding list and hand over control of the process flow to that feature, so that the process flow continues in that feature.

25. Telecommunication network comprising an exchange that comprises at least two features as well as a feature agent for controlling a process flow between and through a number of features subscribing to a certain event in the exchange, wherein the feature agent comprises:

an event receiver for receiving an event, which event marks a starting control point of the flow; and a selector for selecting, in at least one encountered control point of the process flow, a feature which is to take over control of the process flow;

wherein the feature agent includes or has access to, for at least one possible control point within the flow, at least one separate specific for the event and a combination of control points including at least the encountered control point, said list comprising features of differing priorities subscribing to said event and to the combination of control points; and the selector is arranged, for said encountered control point, to select the feature which has the highest priority in the corresponding list and hand over control of the process flow to that feature, so that the process flow continues in that feature.

26. Computer program product comprising:

a computer usable storage medium having computer program code embodied in said medium for causing the assembly of sets of executable computer instructions to provide control of telecommunication services in or for an exchange;

where the exchange comprises or has access to at least two features for performing separate telecommunication services;

said computer program product comprising:

an organizer for organizing sets of executable computer instructions into a feature agent for controlling a process flow between and through a number of features subscribing to a certain event generated in the exchange, so that the feature agent comprises:

an event receiver for receiving an event, which event marks a starting control point of the flow; and a selector for selecting, in at least one encountered control point of the process flow, a feature which is to take over control of the process flow;

wherein the feature agent includes or has access to, for at least one possible control point within the flow, at least one separate list specific for the event and a combination of control points including at least the encountered control point, said list comprising features of differing priorities subscribing to said event and to the combination of control points; and the selector is arranged, for said encountered control point, to select the feature which has the highest priority in the corresponding list and hand over control of the process flow to that feature, so that the process flow continues in that feature.

27. Method of controlling a process flow between and through a number of features subscribing to a certain event and comprising the steps of:

receiving an event, marking a starting control point of the flow;

selecting, in at least one encountered control point of the process flow, a feature which is to take over control of the process flow; and handing over control of the process flow to that feature;

wherein the step of selecting includes:

selecting, from a list comprising features of differing priorities subscribing to said event and to the combination of control points including at least the encountered control point, the feature that has the highest priority, so that the process flow can continue in the selected feature.

* * * * *